June 1, 1965 A. C. GILES 3,187,094
DATA-REPRODUCING APPARATUS FOR SIMULTANEOUS DISPLAY OF SEPARATE
AND MOVING LIGHT IMAGES DEFINING INDICIA DERIVED FROM
SEPARATE SOURCES
Original Filed Sept. 22, 1958 4 Sheets-Sheet 1

INVENTOR.
AQUILA C. GILES
BY
Kane, Dalsimer and Kane
ATTORNEYS

June 1, 1965 A. C. GILES 3,187,094
DATA-REPRODUCING APPARATUS FOR SIMULTANEOUS DISPLAY OF SEPARATE
AND MOVING LIGHT IMAGES DEFINING INDICIA DERIVED FROM
SEPARATE SOURCES
Original Filed Sept. 22, 1958 4 Sheets-Sheet 2

INVENTOR.
AQUILA C. GILES
BY
Kane, Dalsimer and Kane
ATTORNEYS

June 1, 1965
A. C. GILES
3,187,094
DATA-REPRODUCING APPARATUS FOR SIMULTANEOUS DISPLAY OF SEPARATE
AND MOVING LIGHT IMAGES DEFINING INDICIA DERIVED FROM
SEPARATE SOURCES
Original Filed Sept. 22, 1958
4 Sheets-Sheet 3
FIG. 3
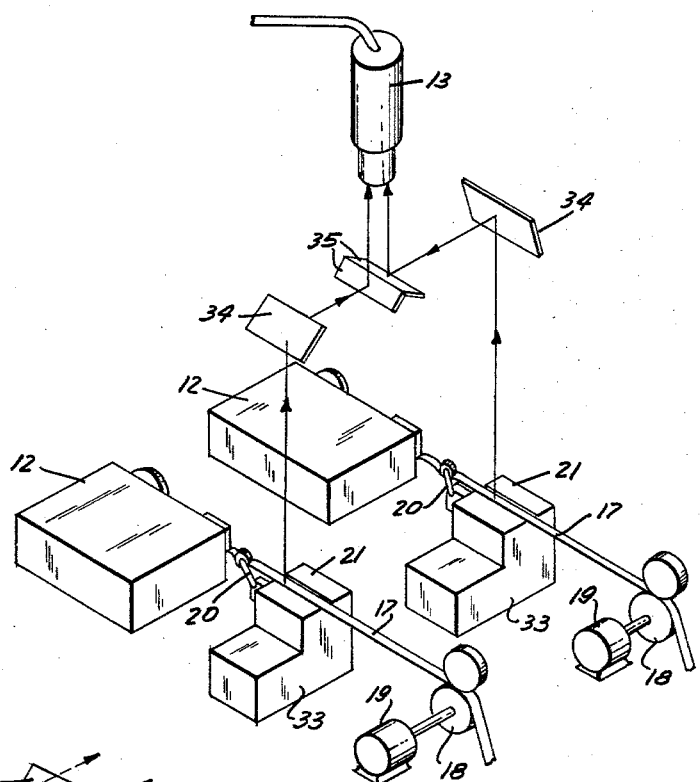
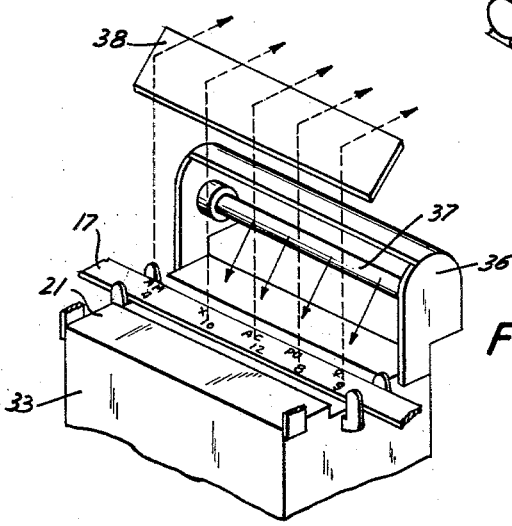
FIG. 4
INVENTOR.
AQUILA C. GILES
BY
Kane, Dalsimer and Kane
ATTORNEYS June 1, 1965 A. C. GILES 3,187,094
DATA-REPRODUCING APPARATUS FOR SIMULTANEOUS DISPLAY OF SEPARATE
AND MOVING LIGHT IMAGES DEFINING INDICIA DERIVED FROM
SEPARATE SOURCES
Original Filed Sept. 22, 1958 4 Sheets-Sheet 4

INVENTOR.
AQUILA C. GILES
BY
Kane, Dalsimer and Kane

ATTORNEYS

3,187,094
DATA-REPRODUCING APPARATUS FOR SIMULTANEOUS DISPLAY OF SEPARATE AND MOVING LIGHT IMAGES DEFINING INDICIA DERIVED FROM SEPARATE SOURCES

Aquila C. Giles, Southampton, N.Y., assignor to Trans-Lux Corporation, New York, N.Y., a corporation of Delaware Continuation of application Ser. No. 762,294, Sept. 22, 1958. This application Nov. 1, 1961, Ser. No. 149,317
4 Claims. (Cl. 178—6.8)

This invention relates to a structurally and functionally improved data-reproducing apparatus, and especially a mechanism with which data-carrying elements, such as sheets and tapes, may be associated in order that the data presented by such elements may be visually reproduced at one or a number of remotely located stations.

This application is a continuation-in-part of my prior application on "Data-Projecting Apparatus and System," Serial No. 741,625, filed in the United States Patent Office on June 12, 1958, and a continuation of my prior application on "Data-Reproducing Apparatus," Serial No. 762,294, filed in the United States Patent Office on September 22, 1958; both now abandoned.

By means of the present teachings an assembly is furnished which will be of especial value when used in conjunction with reproducing apparatus such as tape or web printers of the stock ticker and Dow Jones types; the apparatus serving to reproduce through suitable receivers the inscribed data in the form of light images embracing adequate definition and created immediately subsequent to the imprinting of the data on the elements.

A further object is that of furnishing a mechanism of this type by means of which more than one data-image may be created in a desired number of receivers. Accordingly, the apparatus will lend itself, for example, to use in connection with apparatus imprinting on two or more elements, such as tape, which are fed at different rates of speed, in order that in a remotely located receiver the data on the two different tapes may be simultaneously viewed, their rates of feed determined, etc.

Certain features of the present invention may, however, be used where only a single series of light images is being created. Regardless of the particular installation, apparatus constructed in accordance with the present teachings will involve to a large extent units similar to or identical with mechanisms as heretofore existing, so that it will be unnecessary to design a totally new series of components. Moreover, the apparatus will be relatively quite rugged and capable of being readily serviced.

With these and other objects in mind, reference is had to the attached sheets of drawings illustrating practical embodiments of the invention, and in which:

FIG. 1 is a somewhat diagrammatic face view of an apparatus and showing a complete system;

FIG. 2 schematically illustrates the optical system which may be embraced in the apparatus of FIG. 1;

FIG. 3 is a similar perspective view showing an alternative layout of apparatus;

FIG. 4 shows in perspective a component of the mechanism and embracing an alternative method of illumination.

Figure 1:
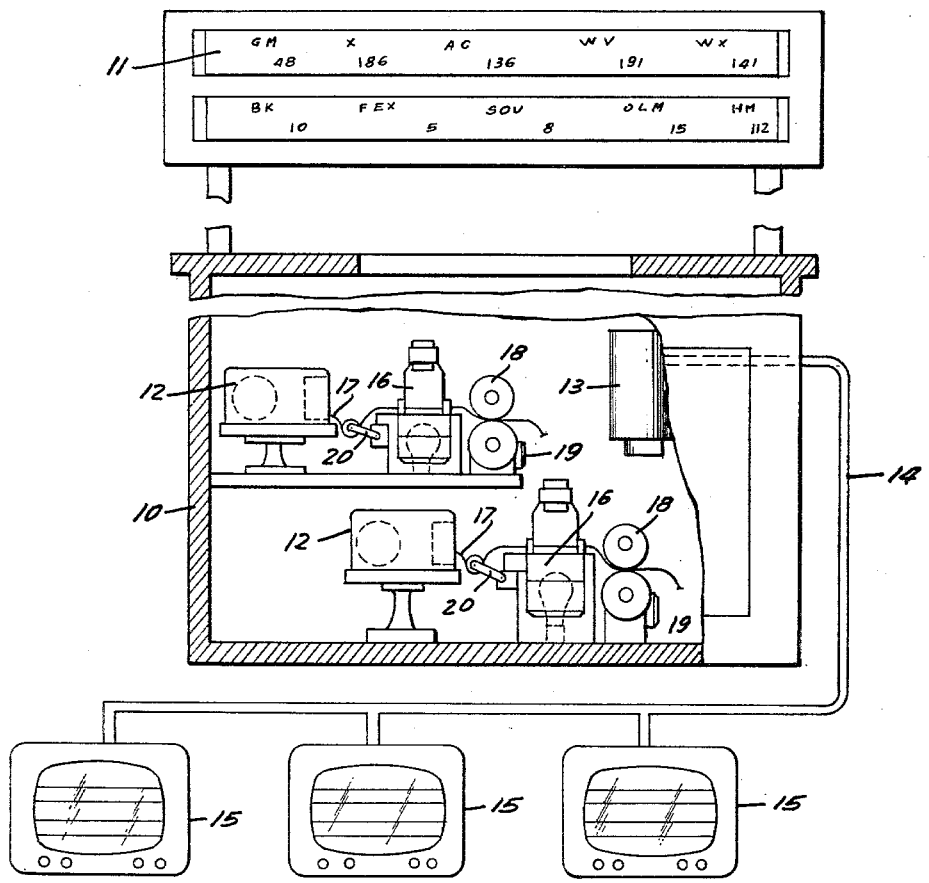

With primary reference to FIG. 1, the numeral 10 indicates a cabinet or enclosure of suitable type, with which there is associated a translucent screen or screens 11. Within or adjacent the cabinet, imprinting mechanisms 12 are disposed. These may be of the conventional stock ticker type and serve to imprint strips in the usual manner. An iconoscope in the form of a television camera 13 is also conveniently disposed within the cabinet 10 and has extending from it leads 14 connected to a suitable number of television receivers 15. Disposed immediately adjacent the printers 12 are housings 16 over which the imprinted strips or tapes 17 pass incident to being engaged by rollers 18. The movements of the latter, in accordance with conventional practice, may be controlled by motors 19, the speed of operation of which is governed in each instance by a control arm 20 cooperating with the loop of tape which may exist between the imprinter 12 and the housing 16.

Figure 2:
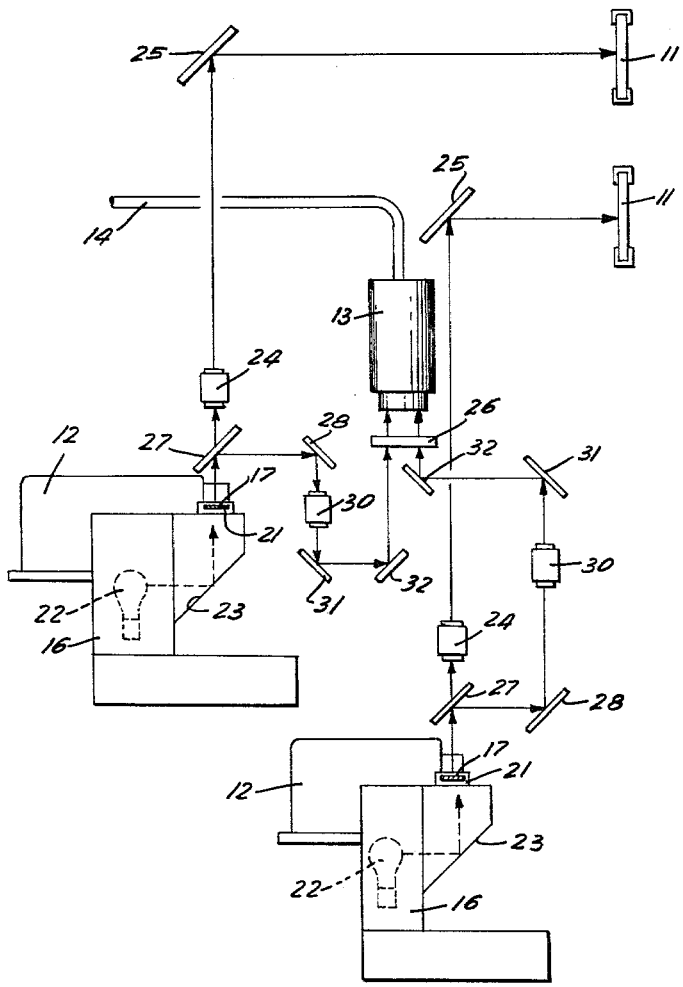

Attention is next invited to FIG. 2, in which a desirable form of optical system involved in the apparatus has been illustrated. In that view it will be observed that each housing 16 includes a guiding or deck surface 21 over which a tape 17 is drawn. This surface is formed with an opening through which light rays may pass. The data-carrying elements 17 are in the form of a transparent or slightly translucent strip. A source of illumination 22 is associated with each housing 16, and by means of a suitable reflecting surface, such as 23, serves to project light rays through the opening in surface 21 and thus through the tape 17. Objective lenses, such as 24, are disposed in the path of the light rays at a point beyond the tape 17. These also have their optical axes in line with reflecting elements 25 in the form of mirrors. The latter are arranged at angles to said axes and reflect the light rays onto the screens 11, to thus reproduce thereon light images of the data appearing on the strips 17. In addition to the foregoing, and in accordance with conventional practice, various other units may be included in this system, such as condenser lenses, reflectors, etc., etc.

While in certain instances duplicates of these light images may be received by the television camera 13, it is preferred in accordance with the present teachings, to provide within the field of the iconoscope a receiving member 26 common to and upon the surface of which the different light images will be initially reproduced. This member is properly correlated with respect to the camera, and preferably includes a suitable amount of translucency. Interposed between the surfaces 21 of the housings 16 and the objective lenses 24 are light transparent mirrors or reflecting units 27. These may extend at angles of 45° to the main optical axis of a unit. They serve to reflect a light image into mirrors 28, beyond which in each instance a suitable lens assembly 30 is conveniently disposed. That lens assembly, through further reflecting mirrors 31 and 32, serves to recreate upon the surface of member 26 a light image corresponding to that created on one of the screens 11.

It will be appreciated that the unit 27 in each instance is sufficiently transparent to light rays so that the image appearing upon a given screen 11 will be well defined. In many instances, only around 5% of the light otherwise passing through objective lens 24 will be diverted by the mirror 27. This will be adequate to provide a sufficiently defined image on member 26, especially if that member is carefully correlated to the camera 13. Also, it will be understood that in many instances it will not be necessary to use an entire series of reflecting elements such as 28, 31 and 32, in that it will be feasible to provide for a more direct path between the reflecting element 27 and screen member 26.

With a layout of apparatus such as the aforegoing, it will be understood that simultaneously with the creation of the light image upon a given screen 11, an identical image will be created upon the surface of member 26. This will be picked up by the camera 13 and through the leads 14 will cause the surfaces of receivers 15 to be activated to again simultaneously display the image to be reproduced. The areas of the display surface of each receiver will—as shown—be adequate to permit of the simultaneous reproduction of light images representing different imprinted elements. Ordinarily, not more than two tapes will require simultaneous reproduction.

In FIG. 3 the apparatus has been illustrated as not including optical reproducing mechanism involving screens such as 11. Rather, housings 33, corresponding to housings 16, are employed and provide deck surfaces over which the strips 17 are drawn by means of rollers 18 operated by motors 19 controlled by arms 20 supported by the tapes. The casings 33 may be provided with interior illumination corresponding to bulb 22, as aforedescribed. Otherwise, as hereinafter traversed, a different type of illumination is utilized. Reflecting elements, such as mirrors 34, are located a suitable distance from the tapes 17. These serve to reflect images into mirrors 35 arranged adjacent each other to provide a common receiving member assembly. These mirrors are angularly disposed to in turn reflect the images onto the mosaic of the camera 13. Of course, if desired, a receiving member, such as 26, might conveniently be interposed in the optical system.

It is apparent that with apparatus such as the foregoing, units 12 will imprint data upon the faces of tapes 17, which will pass over the surfaces 21 of housings 33. As loops are created between these housings and the printers 12, arms 20 will serve to regulate the speed of motors 19, so that the tapes will be fed at proportionate speeds. Simultaneously, the data thereon will be picked up by camera 13 and reproduced in receivers 15 located at conveniently remote stations from that occupied by the apparatus of FIG. 3.

In certain instances, and especially where an opaque tape or element is employed, reflected light may be utilized, rather than light rays passing from the interior of the housing through the tape. A desirable arrangement in this connection has been shown in FIG. 4, in which the numeral 33 again identifies a proper housing or casing furnishing an upper surface 21 to receive the tape. Adjacent unit 33 a shield 36 may be furnished to receive and mount a source of illumination 37 of the fluorescent tube type. This tube will be of a length such that a proper number of characters or indicia units upon the tape will be adequately illuminated. The image will be reflected, for example, by a mirror 38, which may correspond to the mirror 34, or else to mirrors such as 28. In any event, a proper light image will be received by the camera.

Figure 5:
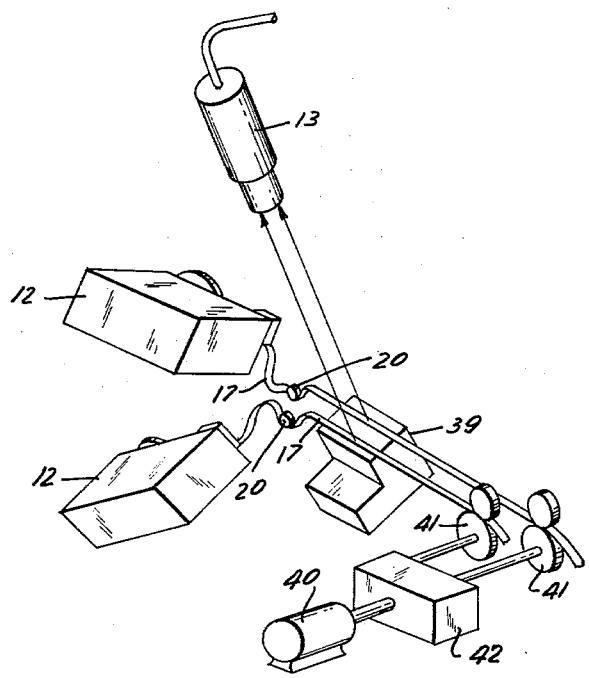
FIG. 5 is a diagrammatic perspective view of a still further form of apparatus which may be employed.

In certain instances, objection may be noted, due to the fact that the desired reproduction of data does not occur soon enough after that data is imprinted upon the tape or other element. Such a condition will exist where the printer is spaced too great a distance from the display or viewing station. The printers 12, in accordance with conventional practice, have their imprinting mechanism usually located adjacent a corner of the casing which generally defines the printers. As diagrammatically indicated in FIG. 5, and in order that there may be a minimum time interval between imprintings of the tape 17 by a given printer and the data images being picked up by the camera 13, these printers may be "cocked" over so that the corners adjacent the imprinting mechanism, as shown in FIG. 5, are immediately adjacent a housing, such as 39, presenting a supporting surface for the tape. With suitable illumination (not shown in this view), the data will, therefore, immediately be included in the field of camera 13. As also indicated in this view, only a single motor 40 may serve to draw both tapes 17. This will be achieved by having the rollers 41 connected with a gear box 42 serving to provide a differential drive such that if one tape does not require shifting, or else is moving at a slower rate of speed than the other tape, both of the elements will be properly fed. Such a structure obviously could be incorporated in the heretofore described layout of apparatus.

From the foregoing it will be appreciated that among others the several objects of the invention as specifically aforenoted are achieved. Obviously, numerous changes in construction and rearrangements of the parts might be resorted to without departing from the spirit of the invention as defined by the claims.

What I claim is:

1. An apparatus to simultaneously display upon a single screen separate and moving light images defining indicia derived from separate sources, said apparatus including in combination a plurality of strips, mechanisms for individually imprinting said strips with indicia, separate means for exerting a pull upon and moving said strips at different speeds, supporting means for guiding said strips in movements with respect to each other, means for illuminating said supporting means and the strips guided thereon, a television camera, means providing separate light-image paths extending away from said illuminated strips, an image-receiving member operatively disposed with respect to said camera and paths and common to the latter whereby to transmit the light images of the indicia upon different strips to the mosaic of said camera and a television receiver connected to said camera for reproducing those light images.

2. An apparatus to simultaneously display upon a single screen separate and moving light images defining indicia derived from separate sources, said apparatus including in combination a plurality of indicia-carrying members, separate means for exerting a pull upon and moving said members, a common supporting means for guiding said members in movements with respect to each other, means for illuminating said supporting means and the members guided thereon and a single television camera, lens means directing the light rays in the form of images defining the indicia carried by the different members onto separate areas of the mosaic of the camera, and a television receiver operatively connected to said camera to simultaneously reproduce upon different areas of its screen the indicia carried by the different members as they separately traverse said supporting means, a further lens, a transparent mirror disposed adjacent said further lens and arranged at an angle to its axis to reflect a light image to said first-named lens means and the camera, and a receiving surface operatively disposed with respect to said further lens to receive light rays therefrom and display them in the form of light images simultaneously with their appearance on the screen of said television receiver.

3. In an apparatus as defined in claim 2, imprinting mechanism for each of said indicia members, said mechanisms being disposed in advance of the illuminating means therefor and in immediate proximity to each other and to said supporting means.

4. In combination a pair of strip imprinting mechanisms, supports adjacent said mechanisms for receiving strips therefrom, means for moving strips across said supports at speeds different from each other, a light source and optical assembly in operative association with each support and the imprinted strip received thereby to create and direct light images thereof along definite paths, screen means at the ends of such paths, light-transparent mirrors interposed in such paths to deflect a portion of the light rays therefrom, a single television camera, a receiver connected therewith and means directing the deflected rays into the operative field of such camera to thereby cause images of the indicia appearing on both of said strips to be simultaneously displayed by said screen means and said receiver.

References Cited by the Examiner

UNITED STATES PATENTS

| | | | |
|---|---|---|---|
| 1,989,317 | 1/35 | Harper | 178—7.85 |
| 2,611,027 | 9/52 | Hammond | 178—6.7 |
| 2,698,356 | 12/54 | Roos | 178—6.8 |
| 2,934,601 | 4/60 | Oppenheimer | 178—6.8 |
| 2,935,559 | 5/60 | Dornier | 178—6.8 |
| 2,954,429 | 9/60 | Spangler | 178—6.8 |

DAVID G. REDINBAUGH, *Primary Examiner.*

ROY LAKE, *Examiner.*